May 23, 1967
L. S. TAYLOR ETAL
3,320,923
LIQUID LEVEL GAGE
Filed March 24, 1965
2 Sheets-Sheet 1
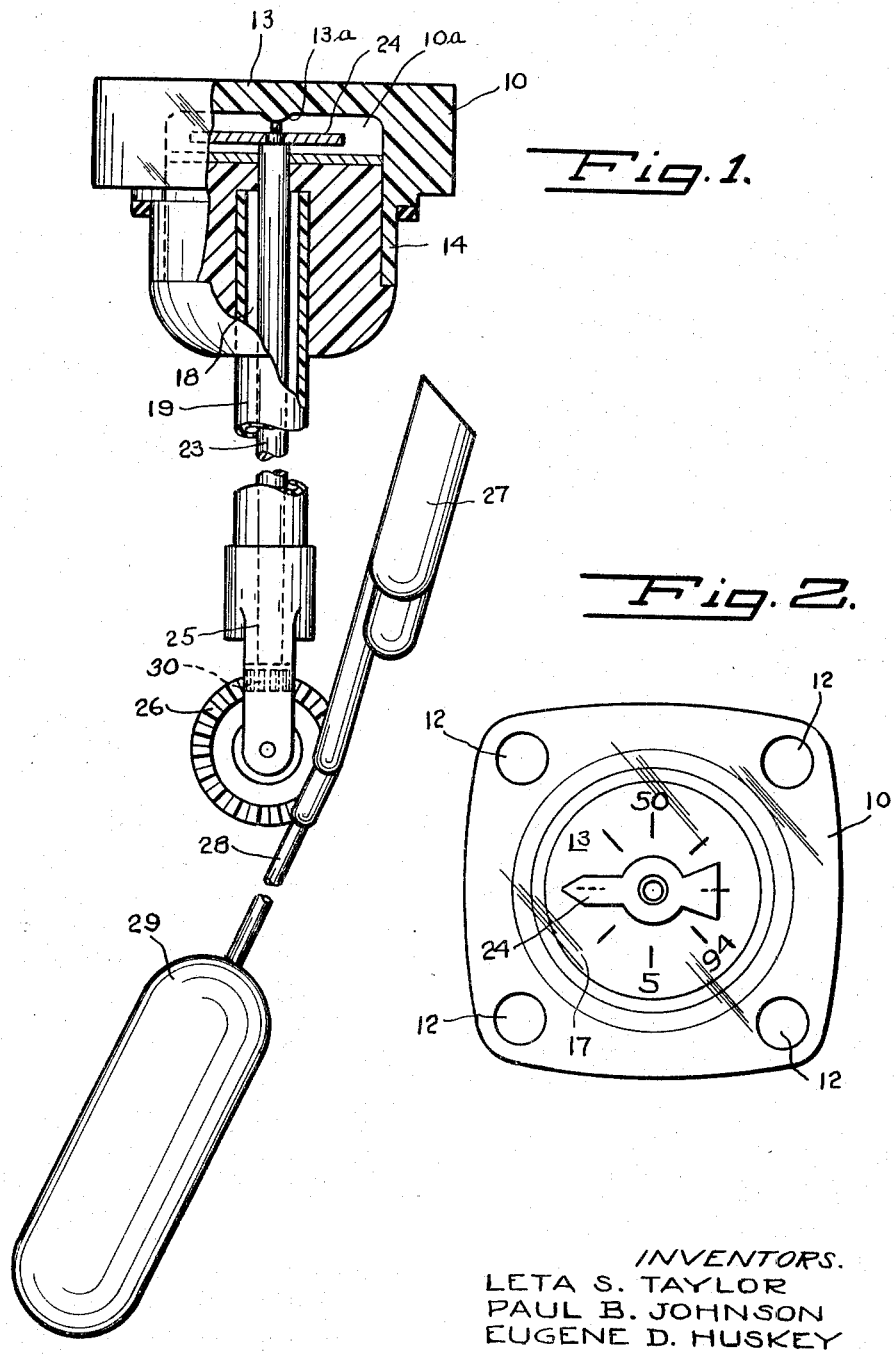
INVENTORS.
LETA S. TAYLOR
PAUL B. JOHNSON
EUGENE D. HUSKEY
BY Raymond A. Paquin
ATTORNEY.

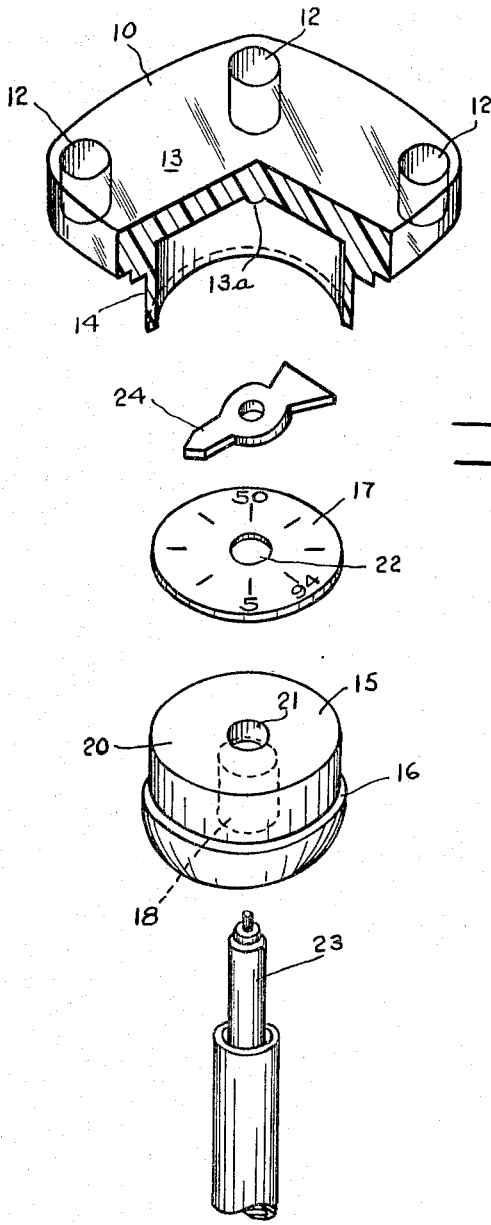

United States Patent Office 3,320,923
Patented May 23, 1967

3,320,923
LIQUID LEVEL GAGE
Leta S. Taylor, Paul B. Johnson, and Eugene D. Huskey, all of Garland, Tex., assignors to J. Y. Taylor Mfg. Company, a corporation of Texas
Filed Mar. 24, 1965, Ser. No. 442,300
1 Claim. (Cl. 116—118)

This invention relates to liquid level gages and has particular reference to a new and improved liquid level gage for fluids or liquefied gases and especially those stored under pressure such as butane and propane.

An object of the invention is to provide a new and improved liquid level gage of the type set forth which is simpler and more economical in construction and assembly than prior type gages and in addition is improved in appearance.

Another object of the invention is to provide a new and improved liquid level gage of the type set forth which eliminates the need for magnets or magnetic drive and crystal usually employed in gages of this type.

Another object of the invention is to provide a new and improved liquid level gage which is adapted to be made of cast plastic material.

Another object of the invention is to provide a new and improved liquid level gage embodying a positive reading indicator.

Another object is to provide a liquid level gage wherein all of the mechanism or indicating components are enclosed within the storage tank.

Another object is to provide a new and improved liquid level gage having an effectively unitary head allowing complete visibility of the indicator and having non-corrosive visible parts and which is resistant to tank liquids and pressure and having its components held and sealed in the tank liquid area.

Another object is to provide a gage of the type set forth wherein all indicating components are below the top surface of the gage head and which prevents the entrance of dust and moisture into the interior of the gage heads.

Another object is to provide a new and improved process of making a liquid level gage.

Other objects and advantages of the invention will be apparent from the following description taken in connection with the accompanying drawings wherein the preferred form of the invention has been shown by way of illustration only.

Referring to the drawings:

FIG. 1 is a side view, partially in section, of a liquid level gage embodying the invention;

FIG. 2 is a top or plan view of the gage head shown in FIG. 1; and

FIG. 3 is an exploded view showing the components of the gage of the invention.

Referring more particularly to the drawings wherein similar reference characters designate corresponding parts throughout, the liquid level gage shown embodying the invention comprises the gage upper head portion 10 adapted to be secured on the storage tank by means of bolts through aligned openings 12 in the gage head 10 and tank mounting flange.

The gage upper head portion 10 is made of cast transparent plastic material such as Plexiglas or other suitable transparent plastic material and, if desired, may have metal inserts cast therein to reinforce the bolt holes 12 and may also have an annular metal plate or disc, cast therein to add strength to the gage head without interfering with visibility through the central viewing portion 13. If desired, an annular metal disc could be placed over the gage upper head portion 10 to provide the desired strength without interfering with the reading of the indicator.

The gage upper head portion 10 is formed with a central recess 10a and the integral depending flange 14 forming a central aperture adapted to receive the reduced portion of head 15 which is of a size and shape to have its outer surface engage the inner wall of flange 14 and be secured thereto by bonding if the head 15 is formed of cast plastic material or by adhesive or other suitable means. Head 15 could also be formed of die cast metal such as aluminum or zinc but the cast plastic head would be more economical.

The head 15 is provided with peripheral flange or shoulder 16 to engage the end of flange 14. This positions the head 15 in predetermined desired position within the recess 10a of gage head 10.

On the upper surface of head 15 is provided the dial 17 carrying suitable indicia for indicating the liquid contents in the storage tank. This dial 17 can be a separate member of metal, plastic or other suitable material and bonded, riveted or otherwise secured to the head or the indicia can be formed directly on the surface of head 15.

Head 15 is provided with the recess 18 in its lower side into which is positioned the upper end of riser tubing 19 which can be of suitable plastic material or metal and bonded, pinned, staked or otherwise secured to the wall of recess 18 in the head 15.

The upper wall 20 of head 15 has the opening 21 and dial 17 has the opening 22 through which projects the end of drive shaft 23, and on the upper end of shaft 23, in recess 10a is positioned the pointer 24 which can be of metal, plastic, or other suitable material, bonded, riveted or otherwise secured to the end of shaft 23 and adapted to be pivoted thereby to indicate on dial 17 the liquid contents of the storage tank.

The lower end of riser tube 19 is secured to fork member which can be of cast plastic or die cast metal and on which is pivotally mounted the drive gear 26 which carries the counterweight 27 and float rod 28 on which is positioned the float 29, and which could be of chemically resistant plastic.

Drive gear 26 meshes gear 30 to thereby pivot drive shaft 23.

The dial 17 and pointer 24 are preferably made of chemically resistant plastic to avoid corrosion.

Also the portions of gage head 10 surrounding viewing portion 13 can be of laminated plastic for additional strength.

The inner surface of viewing portion 13 of gage head 10 is provided with projection 13a for positioning shaft 23 to position pointer 24 in predetermined relation with dial 17.

In the manufacture of the gage, the riser 19 and head are assembled and then drive shaft 23 and pointer assembled therewith and this unitary sub-assembly is operatively secured to gage head 10. Fork 25 and drive gear 26 with the counterweight, float rod and float can be either secured to riser 19 before or after the unitary sub-assembly is connected to gage head 10.

In the manufacture of the liquid level gage of this invention, the gage head 10 may be formed of Plexiglas as previously described or molded or cast of other plastic having sufficient strength such as nylon or an acrylonitrile-butadiene-styrene composition which is relatively stable, tough, hard and rigid and withstands acids and pressure and resists weather.

Other plastics which might be employed depending upon the material with which the gage is to be used are polycarbonates, polystyrenes, acrylics, vinyls or others with suitable properties.

Also, by forming the viewing portion 13 with material of suitable optical properties and curvature, magnification of the dial could be obtained.

From the foregoing it will be seen that we have provided new and improved means and process for obtaining all of the objects and advantages of the invention.

We claim:

In a gage head for a liquid level gage, said gage head having a cast head portion having an upper end portion of reduced size and having a shoulder, said head portion having an opening therethrough and having indicia on its upper side, a movable indicator positioned relative to said indica and actuated by a drive shaft extending through said opening in said head portion, an upper head portion having openings for passage of mounting bolts for mounting the gage on a storage tank, said upper head portion enclosing said end portion of said cast head portion and having a viewing portion through which the indicia and indicator may be viewed, and having a depending flange forming a central aperture for receiving the reduced portion of the head, said depending flange being secured to the adjacent wall of said reduced portion with said depending flange engaging said shoulder on said cast head portion.

References Cited by the Examiner

UNITED STATES PATENTS

| | | | |
|---|---|---|---|
| 896,706 | 8/1908 | Brent | 73—317 |
| 1,024,377 | 4/1912 | Surber | 116—118 X |
| 1,072,819 | 9/1913 | Bush | 116—118 X |
| 1,950,142 | 3/1934 | Hastings et al. | 73—317 |
| 2,684,862 | 7/1954 | Lamb | 73—431 X |
| 2,884,283 | 4/1959 | Korol et al. | 248—27 X |
| 2,992,560 | 7/1961 | Morgan et al. | 73—317 |
| 3,086,249 | 4/1963 | Nelson et al. | 26—250 X |
| 3,143,885 | 8/1964 | Warte et al. | 73—431 |
| 3,152,480 | 10/1964 | Hoff | 73—43 |
| 3,207,830 | 9/1965 | Aldington | 264—268 X |

LOUIS R. PRINCE, *Primary Examiner.*

D. M. YASICH, *Assistant Examiner.*